(12) United States Patent
Liggins et al.

(10) Patent No.: US 10,538,232 B2
(45) Date of Patent: Jan. 21, 2020

(54) VEHICLE RECOVERY SYSTEM

(71) Applicant: Jaguar Land Rover Limited, Whitley Coventry Warwickshire (GB)

(72) Inventors: Steve Liggins, Stratford Upon Avon (GB); Paul Darnell, Royal Leamington Spa (GB); Jason Walters, Warwick (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 296 days.

(21) Appl. No.: 14/425,028

(22) PCT Filed: Sep. 5, 2013

(86) PCT No.: PCT/EP2013/068413
§ 371 (c)(1),
(2) Date: Feb. 28, 2015

(87) PCT Pub. No.: WO2014/037471
PCT Pub. Date: Mar. 13, 2014

(65) Prior Publication Data
US 2015/0239456 A1    Aug. 27, 2015

(30) Foreign Application Priority Data

Sep. 6, 2012  (GB) .................................. 1215903.4

(51) Int. Cl.
*B60W 10/22* (2006.01)
*B60W 10/18* (2012.01)
(Continued)

(52) U.S. Cl.
CPC ............. *B60W 10/22* (2013.01); *B60K 28/16* (2013.01); *B60W 10/11* (2013.01); *B60W 10/18* (2013.01); *B60W 10/20* (2013.01); *B60W 30/188* (2013.01)

(58) Field of Classification Search
None
See application file for complete search history.

(56) References Cited

U.S. PATENT DOCUMENTS 4,762,196 A    8/1988 Harada et al.
7,072,756 B2   7/2006 Matsuda
(Continued)

FOREIGN PATENT DOCUMENTS

CN    1618648 A    5/2005
CN    1784564 A    6/2006
(Continued)

OTHER PUBLICATIONS

Japanese Reasons for Refusal, in Japanese with English translation, corresponding to JP application No. 2015-530397, dated Mar. 29, 2016, 9 pages.
(Continued)

*Primary Examiner* — Hussein Elchanti
*Assistant Examiner* — Paul A Castro
(74) *Attorney, Agent, or Firm* — Reising Ethington P.C.

(57) ABSTRACT

The present invention relates to a vehicle recovery system (1) for a vehicle having at least one driven wheel. The vehicle recovery system (1) is operable to self-recover the vehicle from terrain having a deformable surface affording insufficient traction at the at least one driven wheel to mobilise the vehicle. A recovery controller (2) is provided to maintain at least substantially continuous rotation of said at least one driven wheel at a target recovery speed or within a target recovery speed range to increase the available traction at each driven wheel. The present invention also relates to a vehicle having a vehicle recovery system (1).

18 Claims, 4 Drawing Sheets

(51) Int. Cl.
*B60K 28/16* (2006.01)
*B60W 10/11* (2012.01)
*B60W 10/20* (2006.01)
*B60W 30/188* (2012.01)

(56) References Cited

U.S. PATENT DOCUMENTS

| | | | |
|---|---|---|---|
| 7,302,333 B2 | 11/2007 | Steen et al. | |
| 7,474,951 B1* | 1/2009 | Lenz | B60K 28/16 180/197 |
| 8,244,445 B2 | 8/2012 | Luehrsen et al. | |
| 8,328,690 B2 | 12/2012 | Ohtsu | |
| 8,577,569 B2 | 11/2013 | Ohtsu | |
| 9,200,577 B2 | 12/2015 | Momose et al. | |
| 2005/0103549 A1* | 5/2005 | Matsuda | B60K 6/44 180/243 |
| 2005/0242663 A1 | 11/2005 | Erban | |
| 2007/0095585 A1* | 5/2007 | Imura | B60K 6/44 180/65.31 |
| 2008/0167821 A1* | 7/2008 | Breed | G08G 1/161 701/301 |
| 2011/0066341 A1* | 3/2011 | Ohtsu | B60W 10/06 701/65 |

FOREIGN PATENT DOCUMENTS

| | | |
|---|---|---|
| CN | 101423029 A | 5/2009 |
| DE | 10204678 A1 | 8/2003 |
| DE | 102004021374 A1 | 11/2005 |
| DE | 102006061391 A1 | 6/2008 |
| EP | 1535786 A1 | 6/2005 |
| EP | 1777096 A1 | 4/2007 |
| GB | 2377279 A | 1/2003 |
| GB | 2454315 A | 5/2009 |
| JP | S63137047 A | 6/1988 |
| JP | 2005147056 A | 6/2005 |
| JP | 2007038918 A | 2/2007 |
| JP | 2008141875 A | 6/2008 |
| JP | 2010018147 A | 1/2010 |
| JP | 2010101396 A | 5/2010 |
| JP | 2010167981 A | 8/2010 |
| JP | 2011063121 A | 3/2011 |
| JP | 2011178378 A | 9/2011 |

OTHER PUBLICATIONS

International Search Report for application No. PCT/EP2013/068413, dated Apr. 14, 2014, 8 pages.
UK Combined Search and Examination Report for corresponding application No. 1215903.4, dated Jan. 4, 2013, 7 pages.
Written Opinion for application No. PCT/EP2013/068413, dated Apr. 14, 2014, 8 pages.
Chinese Office Action in Chinese with English translation for CN application No. 201380057913.0, dated Oct. 10, 2016, 19 pages.
Japanese Office Action in Japanese with English translation for JP application No. 2015-530397, dated Nov. 22, 2016, 7 pages.
Japanese Office Action in Japanese with English translation for Japanese application No. 2015-530397, dated Oct. 6, 2017, 8 pages.
Notice of Reason(s) for Refusal for JP application No. 2015-530397 with translation, dated May 8, 2018, 16 pages.

* cited by examiner

VEHICLE RECOVERY SYSTEM

TECHNICAL FIELD

The present invention relates to a vehicle recovery system. The vehicle recovery system is particularly well suited for off-road applications. The present invention also relates to a vehicle incorporating a vehicle recovery system.

BACKGROUND

When driving a vehicle off-road in terrain having deformable surface properties, such as sand, the vehicle can become immobilised or stranded. A particular problem when attempting to recover the immobilised vehicle is that the rotation of the wheels can expel loose material without providing sufficient traction to recover the vehicle.

At least in certain embodiments, the present invention sets out to overcome or at least ameliorate the above problem.

SUMMARY OF THE INVENTION

Aspects of the present invention relate to a system and to a vehicle incorporating same, as claimed in the appended claims.

In a further aspect, the present invention relates to a vehicle recovery system for a vehicle having at least one driven wheel, the vehicle recovery system being operable to self-recover the vehicle from terrain having a deformable surface affording insufficient traction at said at least one driven wheel to mobilise the vehicle, the vehicle recovery system comprising:

a recovery controller configured to maintain at least substantially continuous rotation of said at least one driven wheel at a target recovery speed or within a target recovery speed range suitable for increasing the available traction at said at least one driven wheel. The recovery controller is operable automatically to maintain said at least one driven wheel in substantially continuous rotation while the vehicle is stationary. By rotating each driven wheel at the target recovery speed or within a target recovery speed range the available traction at each driven wheel can be increased. The vehicle recovery system is suitable for operation on terrain having deformable surface properties, for example comprising loose material which can be re-distributed. At least in some embodiments, the vehicle recovery system is operable to enable a vehicle stranded or immobilised in loose or soft terrain, such as sand or snow, to gain traction and drive out in a controlled manner. The vehicle recovery system can thereby enable an immobilised vehicle to self-recover. The continuous rotation of said at least one driven wheel can redistribute material under the wheel, compacting it and increasing the available traction to enable self-recovery of the vehicle.

The target recovery speed and the target recovery speed range are typically relatively low speeds, for example a rotational wheel speed equivalent to a vehicle speed of less than or equal to 1 km/h, 2 km/h, 3 km/h or 5 km/h. The slow rotation of the driven wheel can compact the loose material under the wheel rather than dispersing it in front of or behind the wheel. The rotational speed of said at least one driven wheel can be maintained within the target recovery speed range. Specifically, the rotational speed of said at least one driven wheel can be maintained below an upper rotational speed threshold; and optionally above a lower rotational speed threshold. The rotation of said at least one driven wheel can continue over a pre-defined period of time to enable material to accumulate under each driven wheel to increase the available traction.

The target recovery speed and/or the target recovery speed range can be pre-defined, for example for a particular terrain type, such as sand or snow. The target recovery speed or target recovery speed range could be modified dynamically, for example based on changes in the rotational speed of a driven wheel in response to application of a given torque at that wheel. Alternatively, or in addition, the vehicle recovery system could be configured to allow the driver to adjust the target recovery speed or target recovery speed range. The driver could, for example, employ a manual controller to adjust the target recovery speed.

The recovery controller could be configured to modify the rotational speed of said at least one driven wheel at a fixed rate of change. Alternatively, the recovery controller can implement a variable rate of change. The recovery controller could be configured to alter a rate of change of the rotational speed of said at least one driven wheel in proportion to a difference between a measured rotational speed and one of the following: (a) the target rotational speed; (b) the upper rotational speed threshold; and (c) the lower rotational speed threshold. The recovery controller could vary wheel speed based on one or more of the following: (a) the vehicle attitude; (b) load conditions; and (c) ground conditions (either detected or user-specified). The recovery controller can thereby control wheel speed dynamically based on the conditions at each wheel.

The recovery controller can modify the rotational speed of each individual driven wheel or an average rotational speed of a plurality of said driven wheels. The recovery controller can be configured to implement changes to the rotational speed of the average rotational speed at a fixed rate of change. Alternatively, the recovery controller can be configured to implement a variable rate of change. The rate of change of the rotational speed of each driven wheel can be altered in proportion to a measured rotational speed of that driven wheel. The rate of change of the average rotational speed of a plurality of said driven wheels can be altered in proportion to an average measured rotational speed of those driven wheels. The rate of change can be altered in proportion to a difference between the average measured rotational speed and one of the following: (a) the target recovery speed; (b) an upper rotational speed threshold; and (c) a lower rotational speed threshold.

The recovery controller can be configured to maintain the rotational speed of said at least one driven wheel at least substantially constant. Alternatively, the recovery controller can be configured to vary or pulse the rotational speed of said at least one driven wheel. The rotational speed of said at least one driven wheel could, for example, be increased and reduced within the target recovery speed range.

The vehicle can have two, three, four or more wheels. The vehicle can, for example, be an automobile or an off-road vehicle. The vehicle can have a single driven wheel, for example a motorbike having a driven rear wheel. Alternatively, the vehicle can have a plurality of driven wheels, for example two or four driven wheels. The invention has particular application in a four-wheel drive off-road vehicle.

The recovery controller can be configured to maintain the rotational speed of each individual driven wheel at said target recovery speed or within said target recovery speed range. The target recovery speed range can be defined by an upper rotational speed threshold and a lower rotational speed threshold. The rotational speed of each individual driven wheel can be maintained below an upper rotational speed threshold; and optionally above a lower rotational speed threshold. The recovery controller can be configured to maintain an average rotational speed of the driven wheels at said target recovery speed or within said target recovery speed range. The average rotational speed can be maintained below an upper rotational speed threshold; and optionally above a lower rotational speed threshold. The recovery controller can be configured to control the average rotational speed independently of or in combination with the control of the rotational speed of said at least one driven wheel. The upper and/or lower rotational speed threshold(s) can be the same or different from the respective thresholds applied for controlling the rotational speed of said at least one driven wheel.

The at least one driven wheel can be driven by a powertrain comprising an internal combustion engine and/or an electric drive motor. The recovery controller can be configured to control the powertrain to vary the rotational speed of said at least one driven wheel. The recovery controller can be configured to control an output speed of the powertrain, for example to increase an idle speed of the vehicle powertrain when said recovery mode is engaged. Conversely, the recovery controller can be configured to decrease the idle speed of the vehicle powertrain when the vehicle has been recovered.

The vehicle recovery system could be adapted for use with a vehicle having a hydrostatic drive. The recovery controller could be configured to control hydraulic pressure to maintain the drive torque within upper and lower thresholds.

The response of each driven wheel to the application of a drive torque can be monitored to provide system feedback. The recovery controller may estimate terrain condition, for example surface friction, drag and deformability, based on the response of each driven wheel. The terrain estimate can be enhanced by comparing the wheel response data to wheel articulation data and/or vehicle attitude data.

The recovery controller can be configured to compare a powertrain output speed to the rotational speed of said at least one driven wheel. The comparison can be used to gauge the available traction at said at least one driven wheel. For example, the recovery controller can determine the relative available traction at the various driven wheels of the vehicle. The recovery controller can thereby determine qualities of the terrain.

The rotational speed of the at least one driven wheel can be controlled by application of the relevant wheel brake and/or by a reduction in motor torque and/or by a redistribution of motor torque via a device such as a controllable limited slip differential (torque vectoring). A clutch control system can be adapted to automatically engage/vary the coupling between motor and transmission and/or a torque vectoring system, to achieve the intended result. The clutch may be a lock-up clutch of a torque converter. The control system may further control motor torque by alteration of the engine torque/speed map, and be fully automatic upon selection of a suitable control by the vehicle driver.

The recovery controller can implement a closed loop control system to control the rotational speed of each wheel independently. The recovery controller can be configured to control the rotational speed of said at least one driven wheel by controlling application of a braking force. A braking force can be applied to reduce the rotational speed of one or more of said driven wheels. This arrangement could be applied if the vehicle does not have a locking differential, for example.

The recovery controller can be configured to operate in a recovery mode for a pre-determined period of time. For example, the recovery controller can reduce the rotational speed of said at least one driven wheel a predetermined time after initiation of the vehicle recovery system. The recovery controller can thereby operate to maintain at least substantially continuous rotation of said at least one driven wheel for a pre-defined period of time, for example greater than or equal to 1 minute, 2 minutes, 3 minutes or 5 minutes. The recovery controller can stop rotation of said at least one driven wheel when the vehicle recovers. The recovery controller can cancel automated control of the rotational speed of said at least one driven wheel in response to one or more of the following conditions: (a) a predetermined time period has elapsed; (b) detection of a pre-defined driver brake pedal and/or accelerator pedal input: (c) a system cancel signal, for example in response to a driver pressing a cancel button or selecting a cancel option; and (d) a system alert. A system alert can, for example, be generated if a vehicle door opens/closes during the vehicle recovery.

A precondition for operation of the vehicle recovery system may be that the driver seatbelt latch is fastened. A system alert to cancel the automated recovery can be generated if the driver seatbelt is unlatched while the vehicle recovery system is operating. This requirement can help to ensure that the driver remains safely within the vehicle during operation of the vehicle recovery system.

The recovery controller can determine when the vehicle has recovered by detecting one or more of the following conditions has been satisfied: (a) a decrease in the rotational speed of said at least one driven wheel; (b) a substantive change in required torque to maintain rotational speed of the wheels; and (c) a longitudinal motion of the vehicle; (d) a vertical motion of the vehicle (for example as the vehicle drives out of a hollow formed by the wheels in the surface material); and (e) an increase in the vehicle speed over ground. The recovery controller can be configured to reduce the rotational speed of said at least one driven wheel when the vehicle has recovered. The recovery controller can, for example, disengage an off-road recovery mode.

A vehicle position sensing device can be provided. The rotational speed of the at least one driven wheel can be compared with a vehicle position sensing device in order to relate wheel and vehicle movement. Camera recognition techniques may be used to determine vehicle movement, for example by looking at the terrain surface to determine whether the vehicle is moving at a speed compatible with transmission output speed/engine speed.

In use, the recovery controller can perform additional functions to assist with vehicle recovery. For example, the recovery controller can perform one or more of the following functions: (a) raise a height of a vehicle suspension; (b) alter a steering angle of said at least one driven wheels; (c) engage a high transfer transmission ratio; (d) alter tyre pressure in said at least one driven wheel; (e) disable a hill descent control; and (f) select a pre-configured gear ratio. The steering angle can be varied while said at least one driven wheel is rotating to help draw additional material under the wheel to increase the available traction at that wheel and potentially pack additional material under a contact patch of said at least one driven wheel to help lift the vehicle out of its entrenched condition. The steering angle can be varied automatically by the vehicle control system.

The present invention also relates to a vehicle comprising a vehicle recovery system of the type described herein.

The vehicle recovery system described herein may comprise an apparatus. The recovery controller can comprise a computational device comprising one or more processors, such as an electronic microprocessor. The processor(s) can be configured to perform computational instructions stored in memory or in a storage device. The vehicle recovery system described herein can comprise one or more processors configured to perform computational instructions.

The vehicle recovery system can also comprise means to generate driver notifications during operation of the vehicle recovery system, for example to notify the driver of the current operating status and/or to provide driver prompts as to any appropriate manual intervention. The driver prompts can, for example, instruct the driver to perform actions to speed recovery time; and/or improve safe operation; and/or avoid re-occurrence. The driver prompts may be output by any suitable method, including voice command, haptic feedback, display message or display chart/graph. A suitable electronic control unit may issue instructions to the driver in response to measurement, estimation or detection of rotational speed.

In a further aspect the present invention relates to a computer system comprising: programmable circuitry; and software encoded on at least one computer-readable medium to program the programmable circuitry to provide the control functions described herein.

The computer system can also comprise a display means arranged to present information to the driver, for example to advise the driver of current status during a recovery phase. The display means can also be configured to provide driver prompts, for example to request manual intervention. The driver prompts may be provided by any suitable method, including voice command, haptic feedback, display message or display chart/graph. A suitable electronic control unit may issue instructions to the driver in response to measurement, estimation or detection of rotational speed.

According to a still further aspect the present invention relates to one or more computer-readable media having computer-readable instructions thereon which, when executed by a computer, cause the computer to perform the control functions described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

One or more embodiments of the present invention will now be described, by way of example only, with reference to the accompanying figures, in which.

DETAILED DESCRIPTION

A vehicle recovery system 1 in accordance with an embodiment of the present invention will now be described with reference to FIGS. 1 to 4. The vehicle recovery system 1 comprises an off-road recovery module (ORR) 2 which provides a driver selectable recovery mode for recovering a motor vehicle (not shown) which is immobilised in a deformable surface, such as deep sand or snow. The vehicle has four wheels all of which are driven by an internal combustion engine via an automatic transmission. The vehicle also has a transfer case for selecting high and low transfer ratios.

Figure 1:
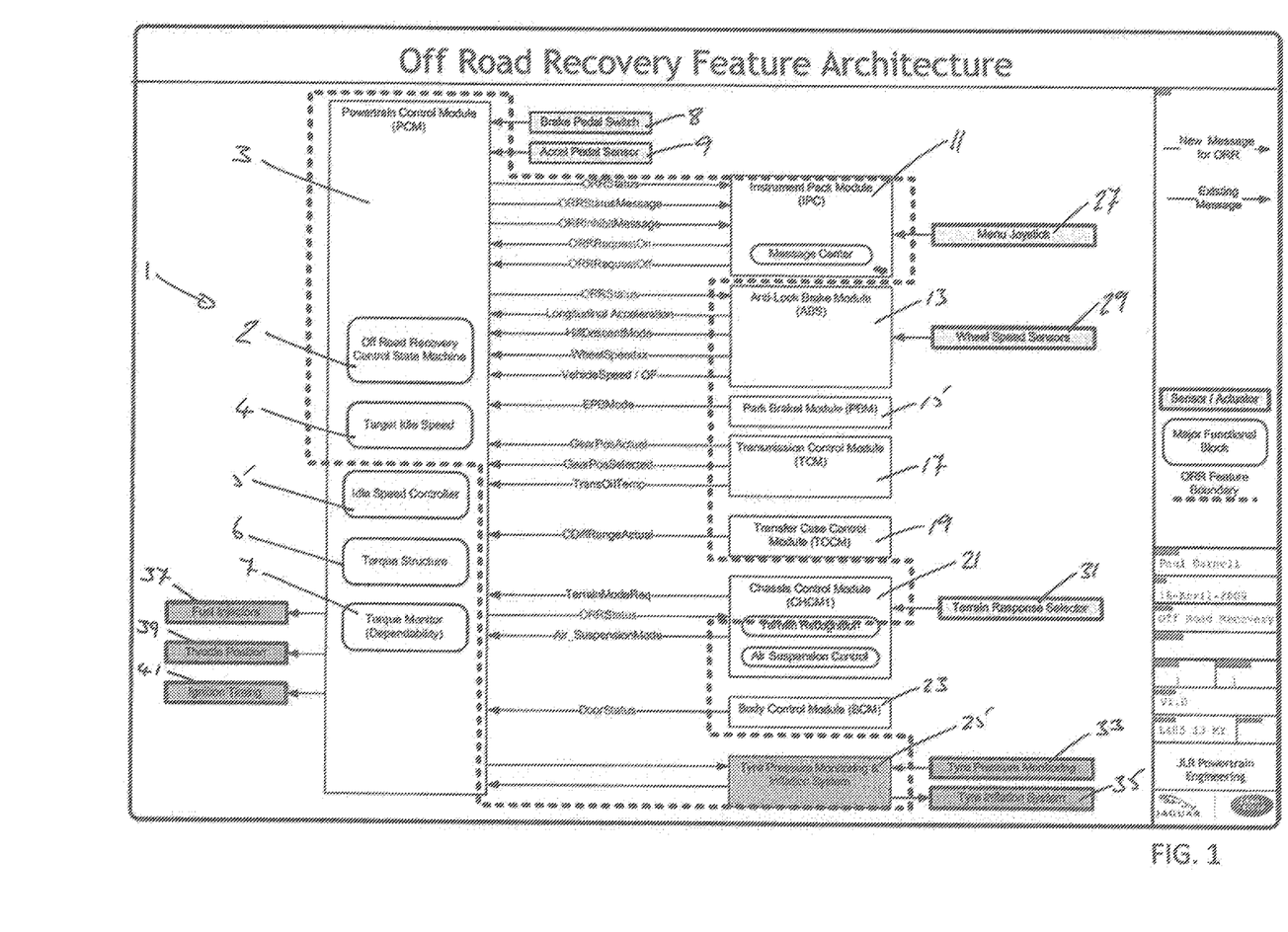
FIG. 1 shows a schematic representation of an off-road recovery system according to an embodiment of the present invention.

As shown in FIG. 1, the ORR 2 forms a part of a powertrain control module (PCM) 3 and communicates with a torque idle speed module 4, an engine idle speed controller module 5, a torque structure module 6, and a torque monitor 7. The torque structure module 6 converts a torque demand into fuel, throttle opening, ignition timing etc., in order to deliver the requested torque via actuation of the combustion engine. The ORR 2 receives operating data from a brake pedal switch 8, an accelerator pedal sensor 9, an instrument pack module (IPC) 11, an anti-lock brake module (ABS) 13, a park brake module (PBM) 15, a transmission control module (TCM) 17, a transfer case control module (TCCM) 19, a chassis control module (CHCM) 21, a body control module (BCM) 23 and optionally a tyre pressure monitoring and inflation system 25.

A menu selection joystick 27 is provided on the IPC 11 to allow a user to select and engage the ORR 2. The ORR 2 and the IPC 11 communicate with each other to enable/disable selection of the ORR 2. A display option for selecting the ORR 2 can, for example, be obscured on the IPC 11 if the required parameters are not satisfied.

The ABS 13 is coupled to four wheel sensors 29 (one for each wheel) for measuring wheel speed (rpm). The ABS 13 outputs vehicle operating data to the ORR 2, including: longitudinal acceleration data; hill descent control status data (i.e. engaged/dis-engaged); measured wheel speed data for each wheel; and vehicle speed data (the average wheel speed). The PBM 15 outputs park brake status data (i.e. engaged/dis-engaged) to the ORR 2. The TCM 17 outputs transmission data, including the engaged gear; the selected gear; and the transmission oil temperature, to the ORR 2. The TCCM 19 outputs transfer case data to indicate whether the high or low transfer ratio is engaged. The BCM 23 notifies the ORR 2 of the vehicle door status to indicate whether the vehicle doors are open or closed.

A drive mode selector 31 is provided on the CHCM 21 to allow a user to select a pre-defined vehicle drive mode, for example to configure the vehicle for driving over a particular type of terrain. The CHCM 21 outputs drive mode data and suspension mode data to the ORR 2. The tyre pressure monitoring and inflation system 25 receives a tyre pressure signal from a tyre pressure monitor 33 and can control a tyre inflation system 35. The PCM 3 outputs ORR status information to the IPC 11, the ABS 13, the CHCM 21 and the tyre pressure monitoring and inflation system 25.

The PCM 3 is configured to control operation of the engine by outputting engine control signals to a fuel injection system 37, a throttle position system 39 and an ignition timing system 41. The idle speed controller module 5 controls an engine idle speed (rpm) $E_i$ by varying the engine control signals. The idle speed controller 5 maintains the engine idle speed $E_i$ above a pre-defined base idle speed and below a pre-defined maximum idle speed, for example 1500 rpm.

Figure 2:
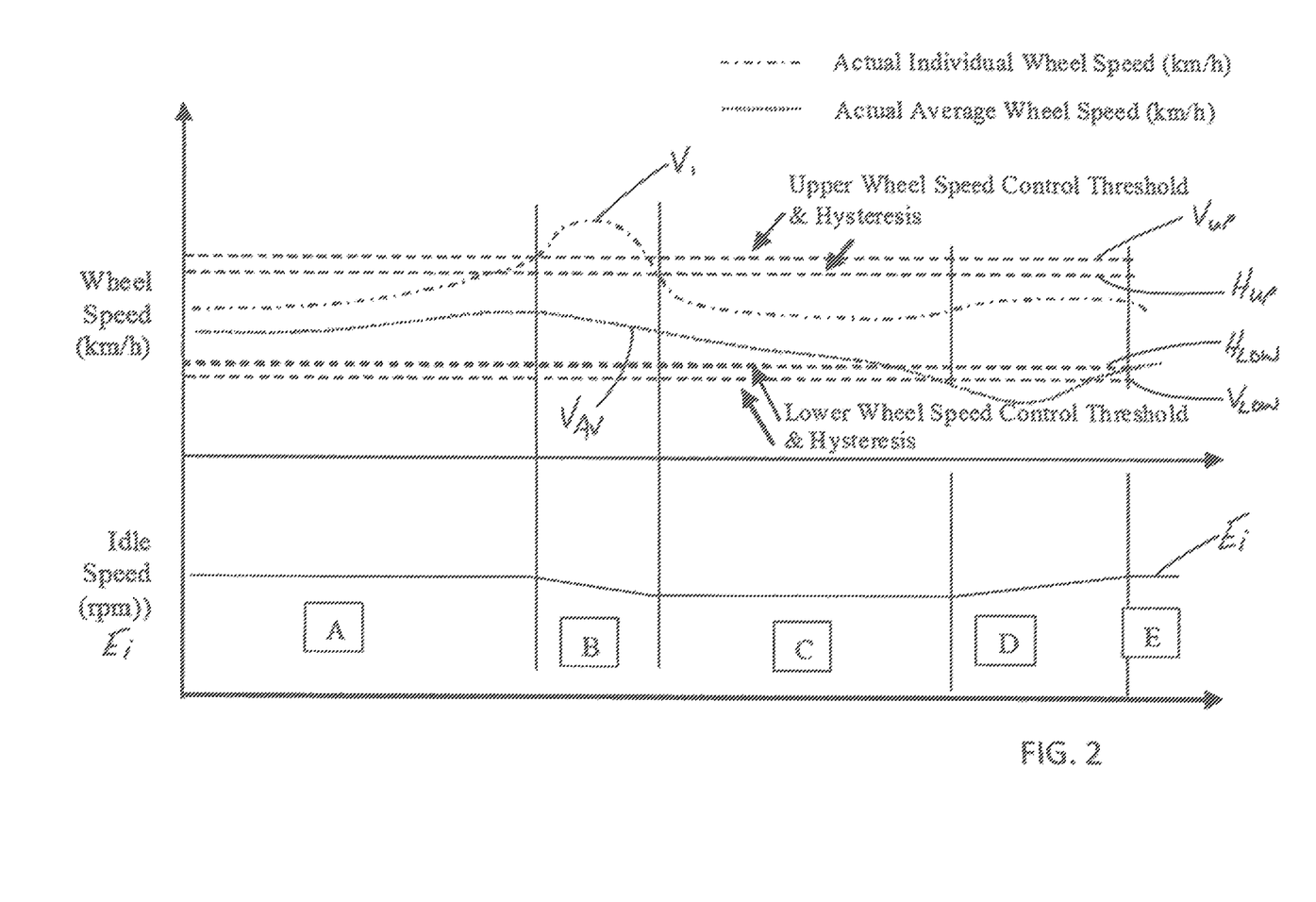
FIG. 2 is a first graph showing the individual and average wheel speed during a recovery event performed by the off-road recovery system according to an embodiment of the present invention.

As shown in FIG. 2, the ORR 2 is configured to control the rotational speed of the driven wheels of the vehicle to achieve a target recovery wheel speed $V_{TGT}$ of approximately 3 km/h. The ORR 2 maintains an individual wheel speed $V_I$ and an average driven wheel speed $V_{AV}$ within a pre-defined target recovery speed range $V_R$ by controlling the engine idle speed $E_i$. It will be appreciated that during recovery the vehicle remains stationary as the driven wheels rotate. The quoted rotational speed of the driven wheels (the target recovery wheel speed $V_{TGT}$, the individual wheel speed $V_I$ and the average driven wheel speed $V_{AV}$) correspond to the rotational speed of the wheel(s) if the vehicle was travelling on hard-packed, level ground.

More specifically, the ORR 2 maintains the individual and average wheel speeds $V_I$, $V_{AV}$ between an upper wheel speed control threshold $V_{UP}$ and a lower wheel speed control threshold $V_{LOW}$. The wheel speed control thresholds $V_{UP}$, $V_{LOW}$ are pre-defined in the ORR 2 and can be calibrated independently of each other. When engaged, the ORR 2 communicates with the engine idle speed controller module 5 to control the engine idle speed $E_I$ to achieve the target recovery wheel speed $V_{TGT}$. The engine idle speed controller module 5 reduces the operating speed of the engine when the individual and average wheel speeds $V_I$, $V_{AV}$ rise above the upper wheel speed control threshold $V_{UP}$; and increases the operating speed of the engine when the individual and average wheel speeds $V_I$, $V_{AV}$ fall below the lower wheel speed control threshold $V_{LOW}$. The engine is thereby controlled to provide continuous rotation of the driven wheels within the target recovery speed range $V_R$. The ORR 2 can automatically apply a braking force to one or more driven wheels to maintain individual wheel speeds $V_I$ below the wheel speed control thresholds $V_{UP}$.

The ORR 2 is configured to vary the rate at which the engine idle speed changes as a function of the amount by which the measured wheel speed $V_I$, $V_{AV}$ exceeds the upper or lower wheel speed control threshold $V_{UP}$, $V_{LOW}$. The rate of change is directly proportional to the difference between the measured wheel speed $V_I$, $V_{AV}$ and the wheel speed control thresholds $V_{UP}$, $V_{LOW}$.

The ORR 2 also defines upper and lower hysteresis thresholds $H_{UP}$, $H_{LOW}$ within the respective upper and lower wheel speed control thresholds $V_{UP}$, $V_{LOW}$. The hysteresis thresholds $H_{UP}$, $H_{LOW}$ are applied when the wheel speed is returning to the target recovery wheel speed $V_{TGT}$ having exceeded the upper and lower wheel speed control thresholds $V_{UP}$, $V_{LOW}$. The ORR 2 increases or decreases the engine idle speed $E_I$ until the measured wheel speed is above or below the respective lower and upper hysteresis thresholds $H_{LOW}$, $H_{UP}$. By implementing hysteresis, the ORR 2 can reduce changes in the engine speed to provide improved wheel speed control.

When any individual wheel speed $V_I$ exceeds the upper wheel speed control threshold $V_{UP}$, the ORR 2 reduces the target engine idle speed at a controlled rate (Section 'B'). As outlined above, the rate at which the engine idle speed is reduced is a function of the amount that the individual wheel speed $V_I$ exceeds the upper wheel speed control threshold $V_{UP}$. The engine idle speed $E_i$ continues to decrease until the individual wheel speed has fallen below the upper wheel speed control threshold $V_{UP}$ and the upper hysteresis threshold $H_{UP}$. When the average wheel speeds $V_{AV}$ falls below the lower wheel speed control threshold $V_{LOW}$, the ORR 2 increases the target engine idle speed at a calibratable rate (Section 'D'). The rate at which the engine idle speed is increased is a function of the amount that the average driven wheel speed $V_{AV}$ has fallen below the lower wheel speed control threshold $V_{LOW}$. The engine idle speed $E_i$ continues to increase until the average driven wheel speed $V_{AV}$ exceeds the lower wheel speed control threshold $V_{LOW}$ and the lower hysteresis threshold $H_{LOW}$.

In the present embodiment, the ORR 2 can be engaged only if the following vehicle conditions are satisfied:
(a) the vehicle is stationary (or vehicle speed≤a calibratable threshold);
(b) the vehicle doors are closed;
(c) a pre-configured gear is selected ($1^{st}$ gear, $2^{nd}$ gear or a reverse gear);
(d) the low transfer ratio is selected (where available);
(e) the parking brake is released;
(f) an automatic vehicle hold ($_{AV}H$) is not activated;
(g) transmission oil temperature is below a threshold;
(h) engine oil temperature is below a threshold; and
(i) engine coolant temperature is below a threshold.

If these vehicle conditions are not satisfied, the ORR 2 is disabled and cannot be selected via the IPC 11. If the ORR 2 detects that any of these conditions are no longer satisfied during operation, the ORR 2 dis-engages. It will be appreciated that alternate embodiments of the present invention could omit one or more of these vehicle conditions.

Figure 3:
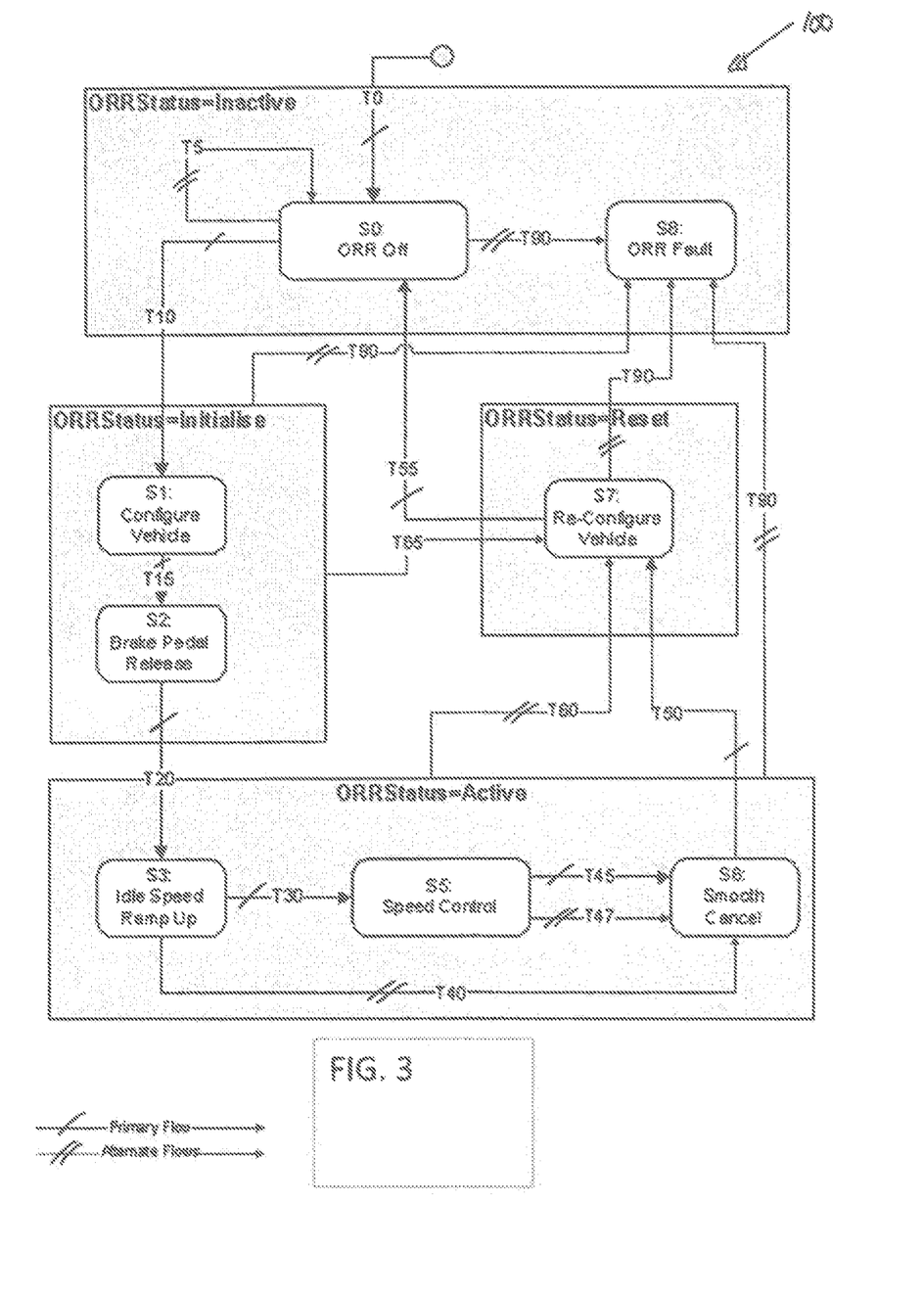
FIG. 3 is a flow chart illustrating the control process a recovery event performed by the off-road recovery system according to an embodiment of the present invention.

A flow chart 100 showing the process steps for engaging the ORR 2 is shown in FIG. 3 and the procedural events are summarised in TABLE A below.

TABLE A

| Transition | Event | ORR Status | Driver Notification |
|---|---|---|---|
| T0 | Ignition On | Inactive | No message |
| T5 | Driver requests ORR but vehicle settings do not allow ORR | Inactive | 15 Display reason for ORR not allowed |
| T10 | Driver requests ORR and Enable Conditions are met | Initialise | Configuring Vehicle |
| T15 | Vehicle Configuration complete or timeout | Initialise | Release Brake To Commence |
| T20 | Foot brake released | Active | ORR Active: Press Brake or Accelerator to Cancel |
| T30 | Wheel Rotation Detected | Active | ORR Active: Press Brake or Accelerator to Cancel |
| T40 | ORR not successful (Timeout, no wheel speed delected etc.) | Active | ORR Not Possible |
| T45 | ORR successful | Active | ORR Finishing |
| T47 | ORR not able to recover vehicle | Active le | ORR Not Possible |
| T50 | Smooth cancel complete | Reset | ORR Finishing |
| T55 | Vehicle Re-Configuration complete or in progress of being completed | Inactive | No message |
| T60 | ORR Enable conditions not met OR brake pressed | Reset | ORR Finishing |
| T65 | ORR Enable conditions not met | Reset | ORR Finishing |
| T90 | ORR System Fault | Inactive | ORR Fault |
| T95 | Driver requests ORR and there is an ORR System Fault | Inactive | ORR Fault |

Once the vehicle conditions outlined above have been satisfied, the ORR 2 is initialised (Step S0) by pressing the service (foot) brake without the accelerator pedal being pressed. The ORR 2 is then initialised (Transition T10) and the vehicle is configured (Step S1) by performing one or more of the following operations:
(a) The ABS 13 raises a target control speed, for example to a value of approximately 10 km/h (based on the expected upper vehicle speed for an engine speed of 1500 rpm, with 2nd gear and low transfer ratio selected), for controlling application of a braking force when the effective wheel speed exceeds the lower target control speed;

(b) The CHCM 21 raises the air suspension to 'Off Road Recovery' height after verifying that the lateral acceleration and/or vehicle attitude is within limits;

(c) The CHCM 21 sets the drive mode to a pre-defined setting for driving on sand; and (d) The tyre pressure monitoring and inflation system 25 optionally reduces the tyre pressure to increase their contact area.

Once the vehicle has been configured, the ORR 2 is activated by the driver releasing the service (foot) brake (Step S2). The engine idle speed $E_i$ is then increased (Step S3) until the upper wheel speed control threshold $V_{UP}$ is exceeded for a predetermined period of time by either an individual wheel speed $V_I$ or the average vehicle speed $V_{AV}$ (Step S5). As described herein, the ORR 2 maintains the engine idle speed between the upper and lower wheel speed control thresholds $V_{UP}$, $V_{LOW}$ for a predetermined period of time.

The ORR 2 can determine whether the vehicle has been successfully recovered using one or more of the following techniques:

(a) a speed over ground measurement (for example determined from a satellite navigation system, or a dedicated speed over ground sensor) exceeds a calibrated threshold;

(b) a measured change in longitudinal and/or vertical acceleration exceeds a threshold;

(c) a rate of decrease in a requested engine torque (including the idle speed control requested torque) exceeds a threshold; and (d) a substantive change in the required torque to maintain rotational speed of the wheels.

In a vehicle having a non-driven wheel(s), the ORR 2 can determine that the vehicle has been successfully recovered by determining when a measured wheel speed of the non-driven wheel exceeds a threshold. A filter can be applied to the measurements to reduce noise and to help avoid false recovery detection.

If the ORR 2 determines that the vehicle has been successfully recovered or that recovery cannot be completed, the engine idle speed is lowered to a base idle speed (Step S6). The vehicle is then re-configured to the state prior to activation of the off-road recovery (Step S7). The ORR 2 is then deactivated (Step S0).

In the event that a fault is detected at any stage, the ORR 2 may be deactivated (Step S8) and the driver optionally informed via a message displayed on the IPC 11. The ORR 2 will also be de-activated (Transition T60) if one or more of the following events occur:

(a) the service (foot) brake is pressed, for example beyond a predetermined threshold pedal pressure limit;

(b) the transmission is moved out of gear;

(c) the measured wheel speed exceeds a cut-off threshold; and (d) the driver cancels using a vehicle interface.

Figure 4:
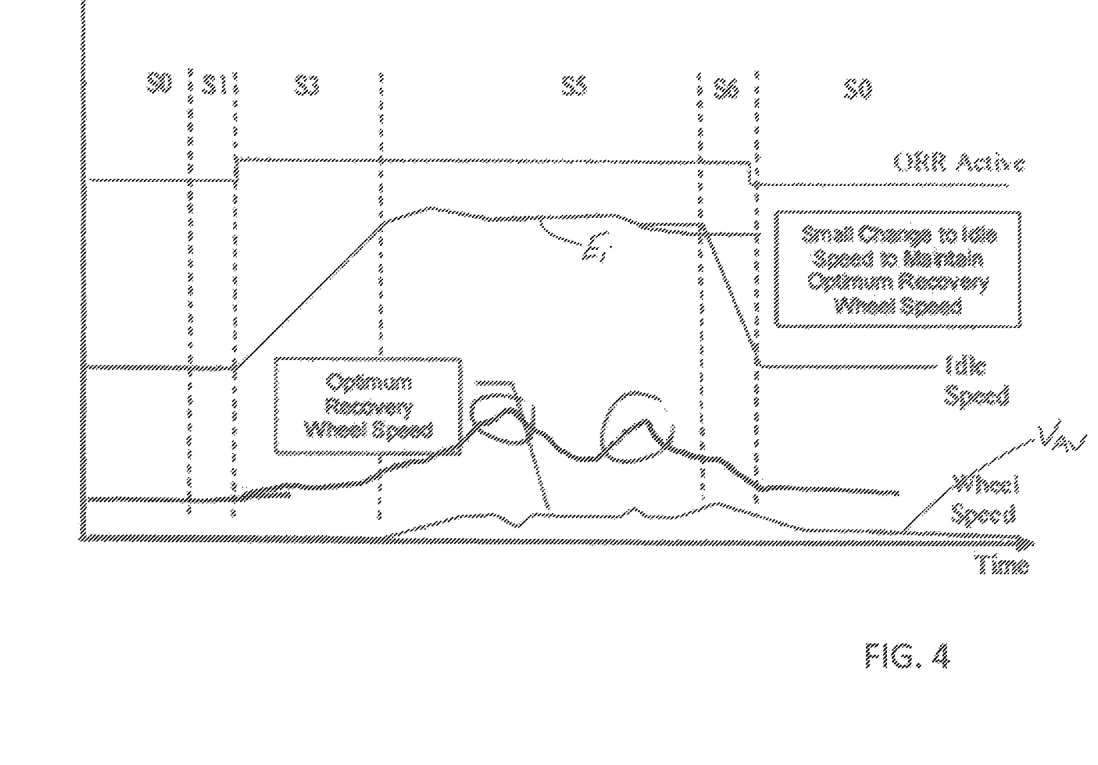
FIG. 4 is a second graph showing the engine idle speed and average wheel speed during the recovery event illustrated in FIG. 3.

The engine speeds and average wheel speed $V_{AV}$ during a typical recovery event are shown in FIG. 4. The vehicle is initially immobilised in sand with the engine operating at the base idle speed. For example, the driven wheels can become entrenched as they dig into the upper layer of a loose material, such as sand. However, the wheels are not rotating and the average wheel speed $V_{AV}$ is zero since resistance to motion is too great (Step S0). The ORR 2 is activated by the driver (Step S1) and the vehicle automatically configures for optimal recovery. When the vehicle is configured, the driver releases the service (foot) brake and the ORR 2 starts to increase the engine idle speed $E_I$. The wheels do not rotate initially due to operation of the torque converter, but the increase in the engine idle speed $E_i$ overcomes the resistance and the wheels start to rotate (Step S3). As described herein, the ORR 2 maintains the individual and average wheel speeds $V_I$, $V_{AV}$ within the upper and lower wheel speed control thresholds $V_{UP}$, $V_{LOW}$ by making small changes to the engine idle speed $E_i$ and the vehicle self recovers (Step S5). The average wheel speed $V_{AV}$ increases and recovery of the vehicle is detected and the engine speed $E_i$ is reduced (Step S6). The vehicle recovery is then completed or cancelled and the vehicle state reset (Step S0). A message is displayed on the IPC 11 to inform the driver about the status of the ORR 2.

The present embodiment has been described with reference to a vehicle having an automatic transmission. However, the system could be implemented on a manual transmission vehicle, for example by providing driver prompts to engage the appropriate gears.

It will be appreciated that various changes and modifications can be implemented in the embodiment described herein without departing from the present invention. For example, a closed loop wheel speed control system can be implemented to control the rotational wheel speed of each individual driven wheel. The invention has been described with reference to varying the requested engine torque to control the rotational wheel speed. Alternatively, or in addition, a braking force could be applied to control the rotational speed of one or more of said driven wheels. The wheel torque management could be varied by controlling clutch engagement to control the transfer of torque from the powertrain to the driven wheels.

The present invention could also be implemented in a hybrid vehicle or an electric vehicle. The ORR 2 could be adapted to select electric only drive when operating to self-recover the vehicle. An electric drive motor(s) can provide fine control of wheel torque at low rotational speeds. This may provide improved wheel speed control at very low speeds than may be readily achievable using an internal combustion engine in conjunction with a torque converter or a clutch arrangement.

Furthermore, the present invention has been described with reference to a four-wheeled vehicle having four driven wheels. However, the invention can be implemented in a four-wheeled vehicle having only two driven wheels. The present invention can be applied to a range of vehicle transmission types, for example automatic, manual, automated manual, dual clutch, continuously variable transmission (CVT) etc. Furthermore, it is not necessary that the vehicle has a transfer case.

The present application is related to the Applicant's earlier application GB 1205708.9, entitled "Vehicle Traction Control" filed on $30^{th}$ Mar. 2012, the contents of which are incorporated herein in their entirety by reference.

It will be appreciated also that the present invention can be implemented in a vehicle having one or more electric motors for driving one or more wheels. The electric motor(s) can, for example maintain rotation of at least one driven wheel at a target recovery speed or within a target recovery speed range. The vehicle could, for example, be a hybrid vehicle, a hybrid electric vehicle or an electric vehicle (EV).

The invention claimed is:

1. A system for a vehicle having at least one driven wheel, the system being operable to recover the vehicle from terrain having a deformable surface affording insufficient traction at said at least one driven wheel to mobilize the vehicle, the system comprising:

a controller configured to maintain at least substantially continuous rotation of said at least one driven wheel of the vehicle at a target recovery speed suitable for increasing the available traction at said at least one driven wheel, the target recovery speed being predefined in dependence on a type of terrain from which the vehicle is to be recovered, and the controller being further configured to alter a rate of change of a rotational speed of said at least one driven wheel in proportion to a difference between a measured rotational speed of said at least one driven wheel and the predefined target recovery speed, such that the rate of change of rotational speed of said at least one driven wheel reduces as the measured rotational speed converges with the predefined target recovery speed.

2. A system as claimed in claim 1, wherein the controller is configured to control a vehicle powertrain to control the rotational speed of said at least one driven wheel.

3. A system as claimed in claim 2, wherein the controller is configured to (i) increase an idle speed of the vehicle powertrain to initiate vehicle recovery, (ii) decrease the idle speed of the vehicle powertrain when the vehicle has been recovered, or both.

4. A system as claimed in claim 1, wherein the controller is configured to control the rotational speed of said at least one driven wheel by controlling application of a braking force.

5. A system as claimed in claim 1, wherein the controller is configured to maintain continuous rotation of said at least one driven wheel for a pre-determined period of time.

6. A system as claimed in claim 1, wherein the controller determines when the vehicle has recovered by detecting one or more of the following conditions:
(a) a decrease in the rotational speed of said at least one driven wheel;
(b) a change in required torque to maintain rotational speed of said at least one driven wheel;
(c) motion of the vehicle;
(d) an increase in the vehicle speed-over-ground.

7. A system as claimed in claim 1, wherein the controller is configured to reduce the rotational speed of said at least one driven wheel when the vehicle has recovered.

8. A system as claimed in claim 1, wherein, when operating in said recovery mode, the controller is further configured to perform one or more of the following functions:
(a) raise a height of a vehicle suspension;
(b) alter a steering angle of said at least one driven wheel;
(c) alter tire pressure in said at least one driven wheel;
(d) disable a hill descent control; and
(e) select a pre-configured gear ratio.

9. A system as claimed in claim 1, further comprising means to generate driver notifications during operation of the system to notify the driver of the current operating status or to provide driver instructions as to any appropriate manual intervention.

10. A vehicle comprising a system as claimed in claim 1.

11. A system as claimed in claim 1, wherein the predefined target recovery speed corresponds to a rotational wheel speed equivalent to a vehicle speed of less than or equal to 3.1 m/h (5 km/h).

12. A system as claimed in claim 1, wherein the controller comprises an input for receiving a signal indicative of the terrain type.

13. A system as claimed in claim 12, comprising a selector for generating the signal indicative of the terrain type in response to a driver selection.

14. A system as claimed in claim 1, wherein the predefined target recovery speed is a predefined upper rotational speed threshold or a predefined lower rotational speed threshold of a predefined target recovery speed range, or wherein the predefined target recovery speed lies between a predefined upper rotational speed threshold and a predefined lower rotational speed threshold of a predefined target recovery speed range.

15. A system as claimed in claim 1, wherein the type of terrain from which the vehicle is to be removed comprises at least one of sand or snow.

16. A system as claimed in claim 1, wherein the type of terrain from which the vehicle is to be removed comprises snow.

17. A system as claimed in claim 1, wherein the type of terrain from which the vehicle is at least one of to be removed comprises sand.

18. A system as claimed in claim 1, wherein the type of terrain from which the vehicle is to be removed comprises loose terrain.

* * * * *